(12) United States Patent
Fröhlich et al.

(10) Patent No.: US 7,552,652 B2
(45) Date of Patent: Jun. 30, 2009

(54) DEVICE FOR DETERMINING AND/OR MONITORING THE VOLUME-AND/OR MASS-FLOW OF A MEDIUM

(75) Inventors: Thomas Fröhlich, Münchenstein (CH); Klaus Bussinger, Reinach (CH); Jacobson Saul, Basel (CH)

(73) Assignee: Endress + Hauser Flowtec AG, Reinach (CH)

( * ) Notice: Subject to any disclaimer, the term of this patent is extended or adjusted under 35 U.S.C. 154(b) by 0 days.

(21) Appl. No.: 11/579,815

(22) PCT Filed: May 4, 2005

(86) PCT No.: PCT/EP2005/052058

§ 371 (c)(1),
(2), (4) Date: Aug. 27, 2007

(87) PCT Pub. No.: WO2005/111549

PCT Pub. Date: Nov. 24, 2005

(65) Prior Publication Data

US 2008/0148866 A1 Jun. 26, 2008

(30) Foreign Application Priority Data

May 7, 2004 (DE) .................. 10 2004 023 147

(51) Int. Cl.
*G01F 1/66* (2006.01)
(52) U.S. Cl. ................................. 73/861.28
(58) Field of Classification Search ........... None
See application file for complete search history.

(56) References Cited

U.S. PATENT DOCUMENTS

| | | | | |
|---|---|---|---|---|
| 4,326,170 A | * | 4/1982 | Levy | 330/10 |
| 4,472,714 A | * | 9/1984 | Johnson | 340/916 |
| 5,059,766 A | * | 10/1991 | Gilliland | 219/130.21 |
| 5,150,415 A | * | 9/1992 | Jaffee et al. | 381/104 |
| 5,225,787 A | * | 7/1993 | Therssen | 327/113 |
| 5,415,172 A | * | 5/1995 | Tannaka et al. | 600/437 |
| 5,777,892 A | * | 7/1998 | Nabity et al. | 702/143 |
| 6,112,601 A | | 9/2000 | Bazin | |

FOREIGN PATENT DOCUMENTS

EP 0 249 691 12/1987

(Continued)

*Primary Examiner*—Harshad Patel
(74) *Attorney, Agent, or Firm*—Bacon & Thomas, PLLC

(57) ABSTRACT

A device for determining and/or monitoring the volume, and/or mass, flow of a medium flowing through a containment in a stream direction. The device includes: At least one ultrasonic transducer, which emits and/or receives ultrasonic measuring signals; and a control/evaluation unit, which determines the volume, and/or mass, flow of the medium in the containment on the basis of the ultrasonic measuring signals according to the travel time difference principle or the Doppler principle. A first clock-pulse generator having a first pulse rate and a second clock-pulse generator having a second pulse rate are provided, with the first pulse rate of the first clock-pulse generator being greater than the second pulse rate of the second clock-pulse generator. The control/evaluation unit operates the first clock-pulse generator intermittently. The control/evaluation unit sizes the duration of a switch-on, or measuring, phase and/or a resting phase as a function of the available energy.

16 Claims, 3 Drawing Sheets

FOREIGN PATENT DOCUMENTS

Figure 1:
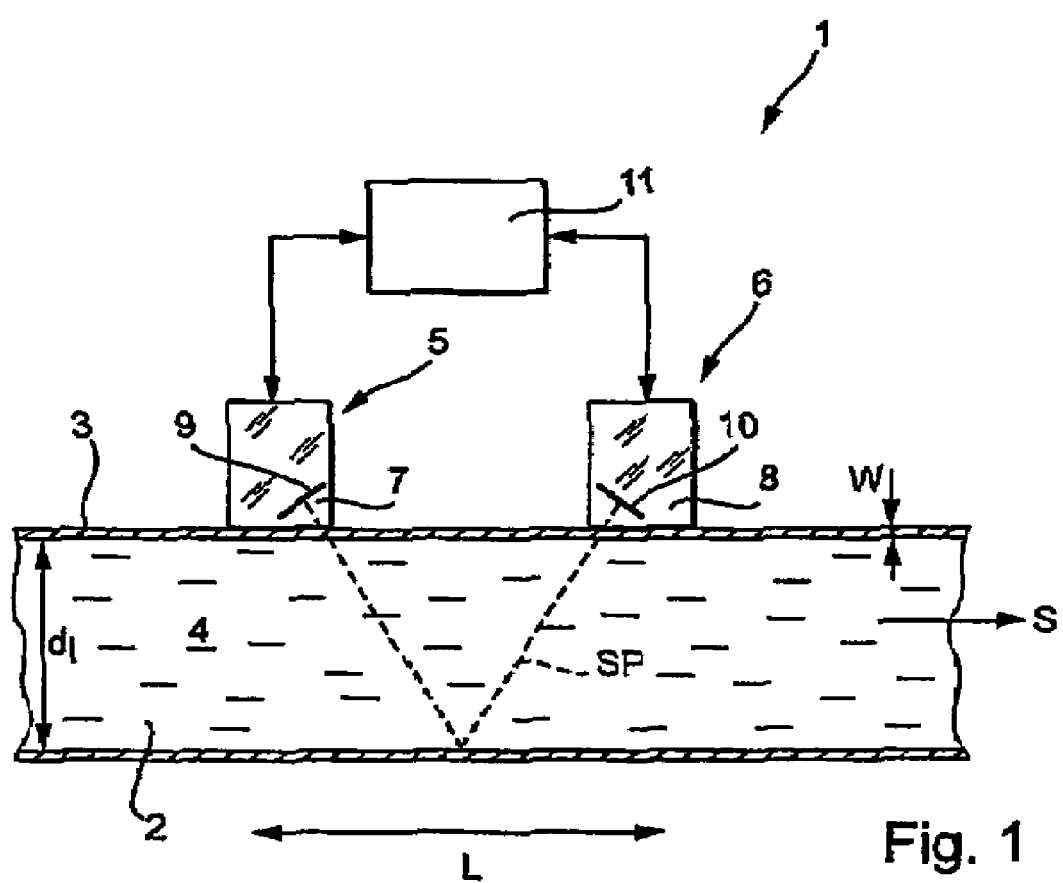

| | | |
|---|---|---|
| EP | 0 426 309 B1 | 5/1991 |
| GB | 223 7639 | 5/1991 |
| GB | 22 66 373 | 10/1993 |
| GB | 22 94 137 | 4/1996 |
| GB | 229 41 38 | 4/1996 |
| JP | 9-133562 | 5/1997 |
| WO | WO 97/01493 | 4/1997 |
| WO | WO 00/70313 | 11/2000 |

* cited by examiner

DEVICE FOR DETERMINING AND/OR MONITORING THE VOLUME-AND/OR MASS-FLOW OF A MEDIUM

FIELD OF THE INVENTION

The invention relates to a device for determining and/or monitoring the volume- and/or mass-flow of a medium flowing in a stream direction through a containment. The device includes at least one ultrasonic transducer, which emits and/or receives ultrasonic measuring signals, and a control/evaluation unit, which determines the volume- and/or mass-flow of the medium in the containment on the basis of the ultrasonic measuring signals, using the travel-time difference principle or the Doppler principle.

BACKGROUND OF THE INVENTION

Ultrasonic flow measuring devices are used often in process and automation technology. They enable contactless determining, especially in a pipeline, of the volume- and/or mass-flow of a medium.

Known ultrasonic flow measuring devices work either on the basis of the Doppler principle or on the basis of the travel-time difference principle. In the case of the travel-time principle, the different travel times of ultrasonic measuring signals, in the stream direction and counter to the stream direction of the medium, are evaluated. For this, the ultrasonic measuring signals of the ultrasonic transducers are alternately emitted and received, in the stream direction and counter to the stream direction of the medium. On the basis of the travel-time difference of the ultrasonic measurement signals, the flow velocity, and therewith, at known pipe diameter, the volume flow rate, or, with known density of the medium, the mass flow rate.

In the case of the Doppler principle, ultrasonic measuring signals of predetermined frequency are coupled into the flowing medium. Ultrasonic measuring signals reflected in the medium are evaluated. On the basis of a frequency shift arising between the in-coupled and reflected ultrasonic measuring signals, also here, the flow velocity of the medium, or, as the case may be, the volume- and/or mass-flow can be determined. The use of flow measuring devices working according to the Doppler principle is, however, only possible, when air bubbles or impurities are present in the medium, on which the ultrasonic measuring signals can be reflected. Therefore, the use of such ultrasonic flow-measuring devices is rather limited, in comparison to ultrasonic flow measuring devices working according to the travel-time difference principle.

Regarding the types of flow measuring devices, a distinction is drawn between ultrasonic flow measuring devices which are introduced into the pipe, and clamp-on flow measuring devices, in the case of which the ultrasonic transducers are pressed externally onto the pipeline by means of a clamping mechanism. Clamp-on flow measuring devices are described, for example, in EP 0 686 255 B1, and in the U.S. Pat. Nos. 4,484,478 and 4,598,593.

In the case of both types of ultrasonic flow measuring devices, the ultrasonic measuring signals are radiated into, and/or received from, the pipeline (in which the flowing medium is located) at a predetermined angle. In order to be able to radiate the ultrasonic measuring signals at a certain angle into the tube and, thus, into the medium, in the case of clamp-on, flow-measuring devices, the in- and out-coupling of the ultrasonic measuring signals into the pipeline occurs through a mediating element, e.g. a coupling wedge. In order to achieve an optimum impedance matching, it is, moreover, known to manufacture the coupling wedges from a suitably refracting material, e.g. of plastic. The main component of an ultrasonic transducer is usually at least one piezoelectric element, which produces and/or receives the ultrasonic measuring signals.

Furthermore, there is increasingly a requirement in process automation, that two-conductor devices be used. Two-conductor devices have, as compared to measuring devices in which the communication between measuring device and remote control location occurs, likewise as does the energy supply of the measuring device, over separated lines, the advantage that at least one line, or conductor-pair, as the case may be, is saved. By the saving of lines, costs and installation times are considerably lessened. Moreover, two-conductor devices are, because of their low energy consumption, best suited for use in explosion-endangered areas, which underlines their attractiveness compared with three, or four, wire devices.

However, in the case of two-conductor devices, there is the problem of covering the energy requirement of the measuring device, despite considerably lessened, available energy. As already indicated, in the case of ultrasonic flow measuring devices, the ultrasonic measuring signals are sent through the medium being measured and, moreover, in the case of clamp-on flow measuring devices, radiated through the pipe wall into the medium being measured, and then out of the medium being measured. Due to unfavorable impedance ratios, a major weakening of the ultrasonic measuring signals is experienced, so that the required amplification, depending on application, lies in the order of magnitude of 20-120 dB. The frequency of the ultrasonic measuring signals lies between about 100 kHz and 10 MHz. Electronic components, which work in this frequency range, require, as is known, relatively large currents, a fact which stands in the way of use of two-conductor technology in the case of ultrasonic flow measuring devices.

SUMMARY OF THE INVENTION

An object of the invention is to provide a device for flow measurement preferably in two-conductor technology, which device is distinguished by an optimized current consumption, respectively, by a relatively small consumption of power.

The object is achieved in a first embodiment of the device of the invention by the features that a first clock-pulse generator having a first pulse rate and a second clock-pulse generator having a second pulse rate are provided, with the first pulse rate of the first clock-pulse generator being greater than the second pulse rate of the second clock-pulse generator, that the control/evaluation unit operates the first clock-pulse generator intermittently, with the control/evaluation unit sizing the duration(s) of a switch-on, or measuring, phase and/or a resting phase as a function of available energy. The duration of a measuring phase is, therefore, variable and is, for example, determined such that it is optimally matched to the available energy.

In an alternative embodiment of the invention, the object is achieved by the features that the first clock-pulse generator works with a first pulse rate and the second clock-pulse generator works with a second pulse rate, with the first pulse rate of the first clock-pulse generator being greater than the second pulse rate of the second clock-pulse generator, and that the pulse rate of the first clock-pulse generator is so selected that the minimum energy required for operating the device during the switch-on phase, or measuring phase, is available. In this case, the pulse rate of the first clock-pulse generator is likewise constant.

The above embodiments of the invention are based on the fact that a significant part of the electrical current at the amplifier of an ultrasonic flow measuring device is consumed by the control/evaluation unit and the associated, fast clock-pulse generator, or oscillator. In order that the control/evaluation unit function correctly, it must be strobed continuously. The control/evaluation unit is composed of a combination of a microprocessor and a logic. Associated with the control/evaluation unit are two clock-pulse generators—the first clock-pulse generator is a fast clock-pulse generator, which has a higher current consumption than the slow, second clock-pulse generator. This fast clock-pulse generator is needed for the travel-time measurement, the sampling of the ultrasonic measuring signals, the loading of the data into a memory unit, the calculating of the flow through the measuring tube, etc..

The second clock-pulse generator is a relatively slow clock-pulse generator, which has a lesser current consumption than the first, fast clock-pulse generator. This clock-pulse generator is needed as a stand-by clock-pulse generator. In the time period, in which the fast clock-pulse generator with the high current consumption is not needed, such is, according to the invention, deactivated. Now, the control/evaluation runs strobed only by the slow clock-pulse generator. If the control/evaluation unit is in the stand-by mode, it then uses less current. As soon as the fast clock-pulse generator is needed, it is again activated.

Advantageous further developments of the device of the invention provide that the flow measuring device is a clamp-on flow measuring device or a measuring device which in introducible into a containment.

It has been found that that constellation is advantageous, in which the first clock-pulse generator is an oscillator. For the second clock-pulse generator, preferably a quartz is used, e.g. a clock quartz. This provides a cost-favorable solution.

Especially, it is furthermore provided that the control/evaluation unit operates the second clock-pulse generator intermittently. However, it is also quite possible to operate the second clock-pulse generator continuously, since it has a relatively low energy consumption due to its low pulse rate.

An advantageous embodiment of the device of the invention provides a current sensor, which delivers to the control/evaluation unit information concerning the current available at a predetermined point in time. An additional option is to determine the current from the measured variable. Furthermore, it is provided that the control/evaluation unit determines the duration of the measuring, and/or the resting, phase of the first clock-pulse generator, and/or of the second clock-pulse generator, on the basis of the current available at the predetermined point in time.

BRIEF DESCRIPTION OF THE INVENTION

Figure 2:
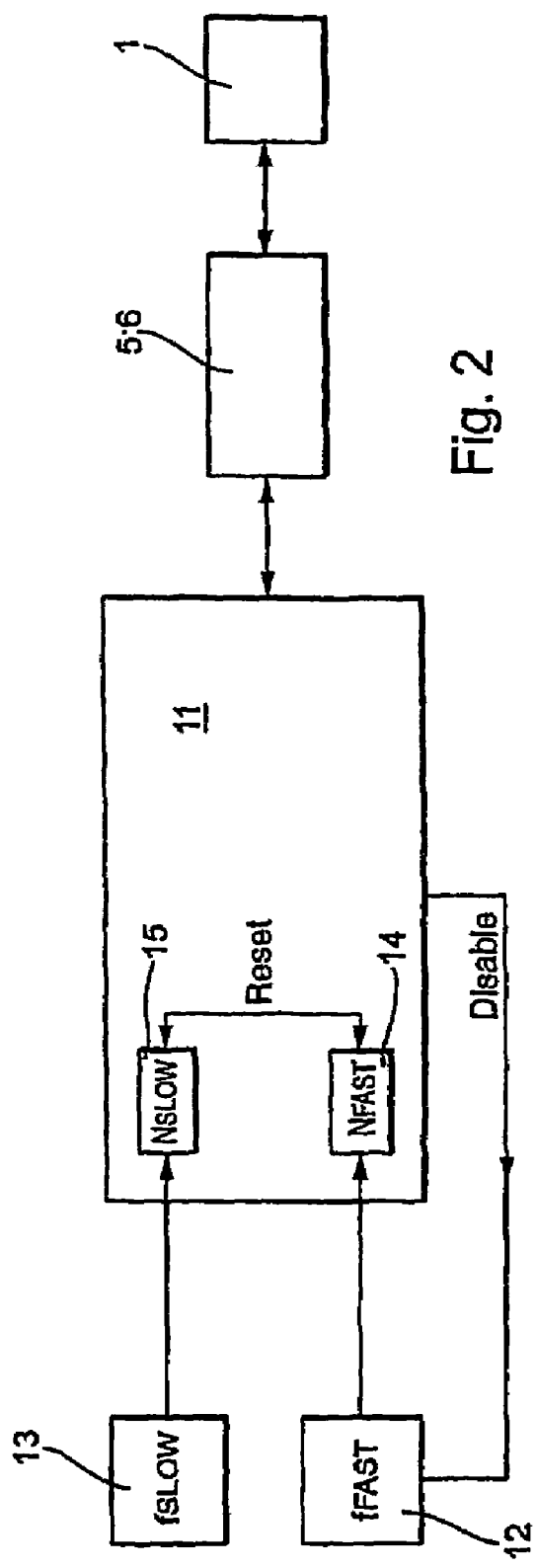
Figure 3:
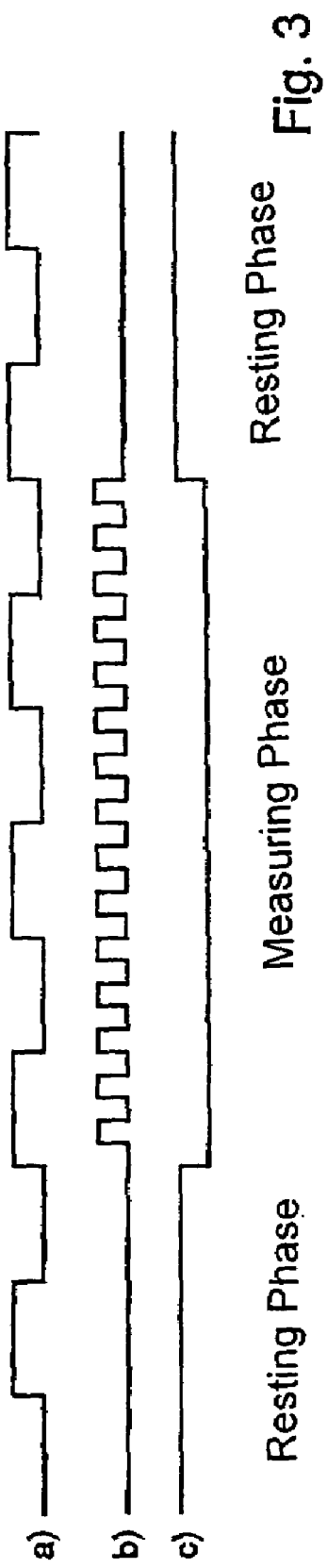
Figure 4:
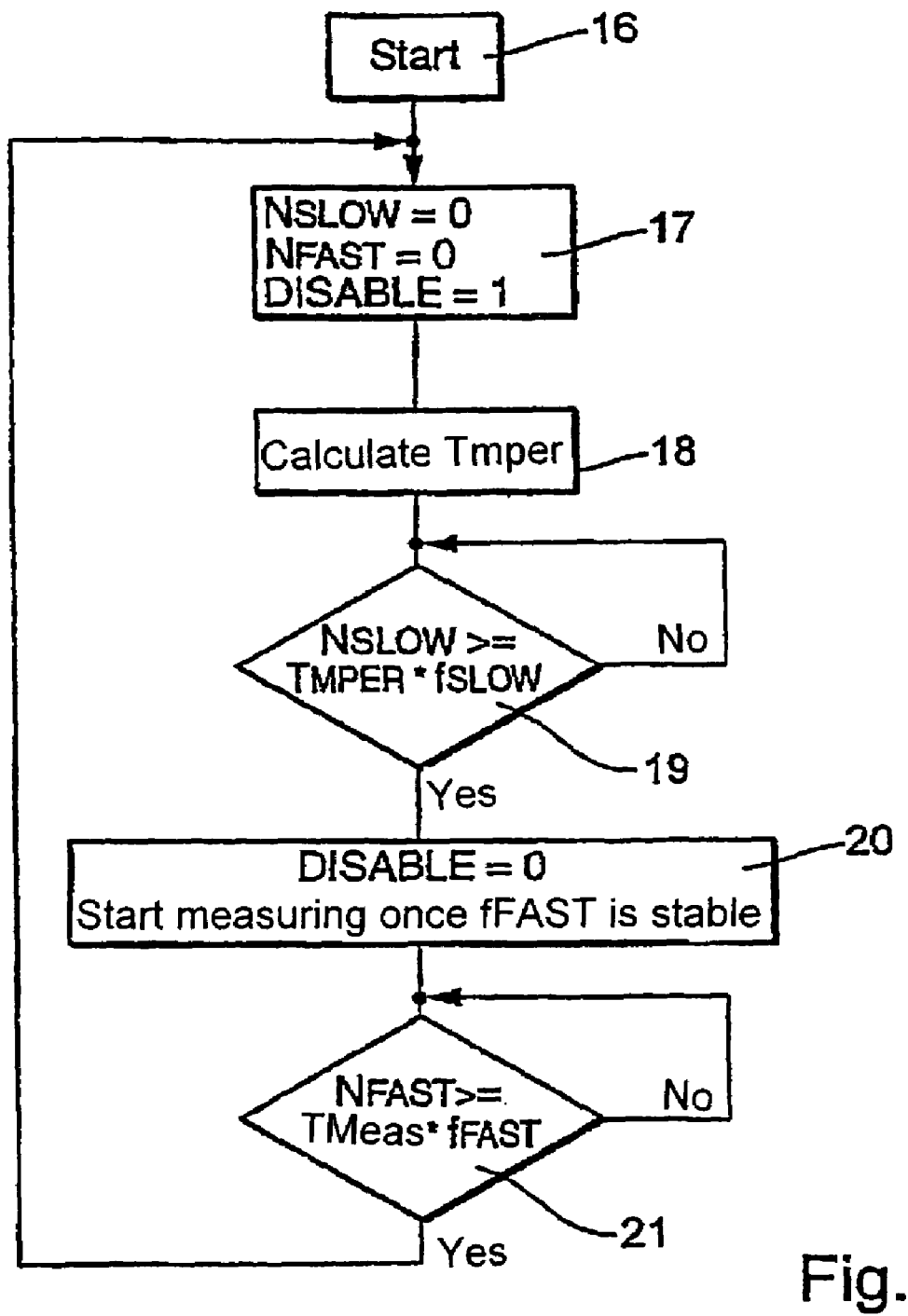

The invention will now be explained in greater detail on the basis of the appended drawings, the figures of which show as follows:

FIG. 1 a schematic drawing of an embodiment of the device of the invention;

FIG. 2 a block diagram showing the operating of the device of the invention;

FIG. 3 run time diagrams of
 a) the first clock-pulse generator
 b) the second clock-pulse generator
 c) the disable-signal; and FIG. 4 a flow diagram for operating the control/evaluation unit installed in the device of the invention.

DESCRIPTION OF THE PREFERRED EMBODIMENTS

FIG. 1 shows a schematic drawing of an embodiment of the ultrasonic flow measuring device 1 of the invention. Measuring device 1 is a clamp-on flow measuring device. In the illustrated case, the measuring device 1 determines volume, or mass, flow, e.g. flow rate, of the medium 4 according to the known travel-time difference method.

Essential components of the clamp-on ultrasonic flow measuring device 1 include the two ultrasonic transducers 5, 6, and the control/evaluation unit 11. The two ultrasonic transducers 5, 6 are mounted on the pipe 2 at a distance L from one another by means of a securement device (not shown). Appropriate securement devices are sufficiently known from the state of the art and are also sold by the assignee. The medium 4 flows through pipe 2 of inner diameter di in the stream direction S.

An ultrasonic transducer 5, 6 includes, as essential component, at least one piezoelectric element 9, 10, which produces and/or receives the ultrasonic measuring signals. The ultrasonic measuring signals are coupled via a coupling wedge 7, 8 into, and out of, the pipe 2, in which the medium 4 is flowing. A coupling wedge 7, 8 is so embodied in known manner that a best possible impedance matching is achieved in the transition from one medium into the other. SP designates the sound path, on which the ultrasonic measuring signals propagate in the tube 2 and medium 4. In the illustrated case, a so-called two-traverse arrangement of the ultrasonic transducers 5, 6 is shown. A traverse designates, in such case, that portion of the sound path SP, on which an ultrasonic measuring signal crosses the container 2 once. The traverses can, depending on arrangement of the ultrasonic transducers 5, 6 and, as required, with provision of a reflector element into the sound path SP, run diametrally or chordally.

The separation L of the two ultrasonic transducers 5, 6 is sized as much as possible such that a large fraction of the energy radiated by, in each case, an ultrasonic transducer 5, 6 into the pipe 2 is received, in each case, by the other ultrasonic transducer 6, 5. The optimum separation L of the two ultrasonic transducers 5, 6 depends on a plurality of system and process variables. If these variables are known, then the optimum separation L of the ultrasonic transducers 5, 6 can be calculated highly accurately via the travel time of the ultrasonic measuring signals. Snell's Law is used in the calculation in known manner. The system and process variables include, especially, the inner diameter di of the pipe 2, the thickness w of the pipe wall 3, the velocity cp of sound in the material of the pipe 2, and the velocity c of sound in the medium 4.

FIG. 2 shows a block diagram for operating the device 1 of the invention, while FIGS. 3a, 3b, 3c show, respectively, the run time diagrams of the first clock-pulse generator 12, the second clock-pulse generator 13, and the disable-signal, with which the control/evaluation unit 11 turns the first clock-pulse generator 12 on and off. While the first clock-pulse generator 12 is operated intermittently, the second clock-pulse generator 13 is operated continuously in the illustrated case. Associated with the first clock-pulse generator 12 is a counter 14, and associated with the second clock-pulse generator 13 is a counter 15.

As already mentioned above, an essential part of the current I on the amplifier of an ultrasonic flow measuring device 1 is consumed by the control/evaluation unit 11 and the associated, fast oscillator—here, the clock-pulse generator 12. In order that the control/evaluation unit 11 work correctly, it must be continuously strobed. The control/evaluation unit 11 is composed of a combination of a microprocessor and a logic. Associated with this control/evaluation unit 11 are the two clock-pulse generators 12, 13. The first clock-pulse generator with a high pulse rate fFast is required, among other things, for the travel-time measurement, the sampling of the ultrasonic measuring signals, the loading of the measured data into a memory unit, and the calculating of the flow of the medium 4 through the measuring tube 2.

The second clock-pulse generator 13 with the slower pulse rate fSlow has a lower current consumption than the first, fast clock-pulse generator 12. Clock-pulse generator 13 is required as a stand-by clock-pulse generator. The fast clock-pulse generator 12 with the high current consumption is, according to the invention, deactivated for the period of time during which it is not needed (resting phase). Now, the control/evaluation unit 11 runs only still strobed by the clock-pulse generator 13 with the slower pulse rate fSlow. If the control/evaluation unit 11 is in this stand-by mode, then it is using relatively little current 1. As soon as the clock-pulse generator 12 with the higher pulse rate fFast is again needed, or as soon as sufficient power is available for operating the ultrasonic flow measuring device 1, then the first clock-pulse generator 12 with the higher pulse rate fFast is again activated.

FIG. 4 shows a flow diagram for operating the control/evaluation unit 11 used in the device of the invention. Especially shown in FIG. 4 is when each clock-pulse generator 12, 13 is used, or what the criteria are for switching from one clock-pulse generator 12, 13 to the other clock-pulse generator 13, 12.

The program is started at point 16. At the program point 17, the first counter 14 is set to the counter level NFast=0. Clock-pulse generator 12 with the pulse frequency fFast is turned off, since Disable is set to 1. Likewise the second counter 15 is set to the counter level NSlow=0. Then, the duration Tmper for the measuring phase, or period, is specified by the control/evaluation unit 11. The specifying and/or calculation of the duration Tmper of a measuring phase can be determined in at least two ways:

1. The duration Tmper of the measuring phase is constant (Tmper=const.). The duration Tmper of the measuring phase, or measuring period, is so selected, that the minimum power available is never exceeded.
2. The duration Tmper of the measuring phase is variable and is, in each case, optimally pre-calculated, or predetermined, as the case may be, as a function of the available power. The available energy is dependent on the value of the current measured variable. The current measured variable is, for example, flow. Since, e.g. in the 4-20 mA technology, a measured flow value corresponds to a defined value of current, the available current is known, or can be calculated, from the following formula:

$$\text{Current } I = 4 \text{ mA} + ((\text{measured variable}) * 16 \text{ mA})/(\text{full scale})$$

Thus, $1/\text{Tmper} = f(I)$, where F is a monotonically increasing function. As a result, the measuring period, or the duration Tmper of a measuring phase, is smaller, the greater the current I. The calculation of the current I and, thus, the presently available energy, occurs at program point 18. Of course, another option is to store the energy in an energy storing element. The control/evaluation unit initiates the next measuring phase, as soon as the required energy for the next measuring phase is available.

At point 19, the program compares whether the counter level NSlow of the counter 15 for the slow clock-pulse generator 13 is greater than TMper*fSlow. As soon as the predetermined counter level has been reached, the program jumps to the program point 20 and activates the fast clock-pulse generator 12. As soon as the fast clock-pulse generator is working stably, the next measuring phase can start. During the measuring time TMeas, counter 15 is activated. The measuring must be ended, when the counter level NSlow of the counter 15 is greater than TMeas*fFast. This examination occurs at program point 21. If the said condition is fulfilled, then the fast clock-pulse generator 12 is again deactivated, and the program jumps in a loop back to the program point 17.

The invention claimed is:

1. A device for determining and/or monitoring volume, and/or mass, flow of a medium flowing through a containment in a stream direction, comprising:
   at least one ultrasonic transducer, which emits and/or receives ultrasonic measuring signals;
   a control/evaluation unit, which determines volume, and/or mass, flow of the medium in the containment on the basis of the ultrasonic measuring signals according to travel-time difference or Doppler shift;
   a first clock-pulse generator having a first pulse rate; and
   a second clock-pulse generator having a second pulse rate, wherein:
   said first pulse rate is greater than said second pulse rate; and
   said control/evaluation unit operates said first clock-pulse generator intermittently, and sizes duration of a turn-on, or measuring, phase and/or a resting phase as a function of available energy.
2. The device as claimed in claim 1, wherein:
the device is one of:
a clamp-on flow measuring device and a measuring device insertable into the containment.
3. The device as claimed in claim 1, wherein:
said first clock-pulse generator is an oscillator.
4. The device as claimed in claim 1, wherein:
said second clock-pulse generator is a quartz.
5. The device as claimed in claim 1, wherein:
said control/evaluation unit operates said second clock-pulse generator intermittently.
6. The device as claimed in claim 1, wherein:
said second clock-pulse generator is operated continuously.
7. The device as claimed in claim 1, further comprising:
a current sensor, which delivers to said control/evaluation unit information concerning the current available at a predetermined point in time.
8. The device as claimed in claim 7, wherein:
said control/evaluation unit determines the duration of the measuring, and/or the resting, phase of said first clock-pulse generator and/or of said second clock-pulse generator on the basis of the current available at a predetermined point in time.
9. The device for determining and/or monitoring volume, and/or mass, flow of a medium flowing through a containment in a stream direction, comprising:
   at least one ultrasonic transducer, which emits and/or receives ultrasonic measuring signals;
   a control/evaluation unit, which determines volume, and/or mass, flow of the medium in the containment on the basis of the ultrasonic measuring signals according to travel-time difference or Doppler shift;
a first clock-pulse generator having a first pulse rate; and
a second clock-pulse generator having a second pulse rate, wherein:
said first pulse rate is greater than said second pulse rate; and
said first pulse rate is so selected, that a minimum energy required for operating the device is available during a switch-on, or measuring, phase.

10. The device as claimed in claim 9, wherein:
the device is one of:
a clamp-on flow measuring device and a measuring device insertable into the containment.

11. The device as claimed in claim 9, wherein:
said first clock-pulse generator is an oscillator.

12. The device as claimed in claim 9, wherein:
said second clock-pulse generator is a quartz.

13. The device as claimed in claim 9, wherein:
said control/evaluation unit operates said second clock-pulse generator intermittently.

14. The device as claimed in claim 9, wherein:
said second clock-pulse generator is operated continuously.

15. The device as claimed in claim 9, further comprising:
a current sensor, which delivers to said control/evaluation unit information concerning the current available at a predetermined point in time.

16. The device as claimed in claim 15, wherein:
said control/evaluation unit determines the duration of the measuring, and/or the resting, phase of said first clock-pulse generator and/or of said second clock-pulse generator on the basis of the current available at a predetermined point in time.

* * * * *